(12) United States Patent
Horii et al.

(10) Patent No.: US 6,352,132 B1
(45) Date of Patent: Mar. 5, 2002

(54) VEHICLE HAVING AN INTAKE PASSAGEWAY AND AN EXHAUST PASSAGEWAY

(75) Inventors: Yoshiyuki Horii; Hajime Shogase, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/654,898

(22) Filed: Sep. 5, 2000

(30) Foreign Application Priority Data

Sep. 5, 1999 (JP) ............................................. 11-291429

(51) Int. Cl.⁷ .......................... B62K 11/04; B60K 13/04
(52) U.S. Cl. ....................................... 180/229; 180/296
(58) Field of Search ................................. 180/219, 218, 180/225, 229, 296, 309, 68.3; 280/284, 285

(56) References Cited

U.S. PATENT DOCUMENTS

| 4,618,019 A | * | 10/1986 | Ando et al. ................. 180/219 |
| 4,781,264 A | * | 11/1988 | Matsuzaki et al. ........... 180/219 |
| 4,815,554 A | * | 3/1989 | Hara et al. ................... 180/219 |
| 4,881,614 A | * | 11/1989 | Hoshi et al. ................. 180/225 |
| 4,901,813 A | * | 2/1990 | Kimura et al. .............. 180/230 |
| 5,183,130 A | * | 2/1993 | Nakamura et al. .......... 180/219 |
| 5,323,869 A | * | 6/1994 | Kurayoshi et al. .......... 180/219 |
| 5,377,776 A | * | 1/1995 | Saiki .......................... 180/219 |
| 5,560,446 A | * | 10/1996 | Onishi ........................ 180/219 |

FOREIGN PATENT DOCUMENTS

JP          63-129687          8/1988

* cited by examiner

*Primary Examiner*—Avraham H. Lerner
(74) *Attorney, Agent, or Firm*—Birch, Stewart, Kolasch & Birch, LLP

(57) ABSTRACT

A vehicle has a connecting tube for air intake disposed on the same side of the vehicle as an exhaust pipe. The connecting tube and the exhaust pipe are disposed on opposite sides of one of right and left side pivot plates, the pivot plates supporting a swing arm.

14 Claims, 4 Drawing Sheets

VEHICLE HAVING AN INTAKE PASSAGEWAY AND AN EXHAUST PASSAGEWAY

BACKGROUND OF THE INVENTION

1. Field of the Invention

This invention relates to a vehicle having an intake passageway and an exhaust passageway located on the same side of the vehicle.

2. Background Art

In Japanese Utility Model No. Sho. 63-129687, there is disclosed a conventional vehicle having a vertically oriented cushion unit located below a vehicle seat, and an exhaust pipe arranged on one side of the cushion unit with a connecting tube communicating with an air cleaner located on the opposite side of the cushion unit.

The connecting tube and the exhaust pipe in the conventional vehicle are located on opposite sides of the vehicle.

It would be desirable to arrange the exhaust passageway and an intake passageway on the same side of a vehicle, rather than on opposed sides. This arrangement would reduce the volume occupied by the intake/exhaust structure within the vehicle. However, when the exhaust passageway and an intake passageway are located on the same side of a vehicle, the heated exhaust passageway may have a detrimental effect on the intake passageway. Because the exhaust passageway is a heat source, it may heat the gases within the intake passageway, which reduces the density of the gases in the intake passageway, thereby reducing oxygen available for combustion in the vehicle engine.

SUMMARY OF THE INVENTION

The present invention overcomes the shortcomings of the conventional art and achieves other advantages not realized by the conventional art.

An embodiment of the present invention includes an exhaust passageway and an intake passageway arranged on the same side of a vehicle. One passageway is arranged at upper sides of the pivot plates, and the other is arranged at lower sides of the pivot plates. The exhaust passageway and the intake passageway are therefore arranged with the pivot plates located between them.

According to the above embodiment of the present invention, even if an exhaust passageway, which is a heat source, is arranged on the same side of the vehicle as the intake passageway, it is possible to avoid any detrimental effect on the intake passageway. Arranging the intake and exhaust passageways in this manner allows for a more compact intake/exhaust structure for the vehicle.

In addition, according to an embodiment of an invention, upper sides of the pivot plates can be connected to a main pipe without providing a designated space for connection, which further reduces the volume occupied by the intake/exhaust structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
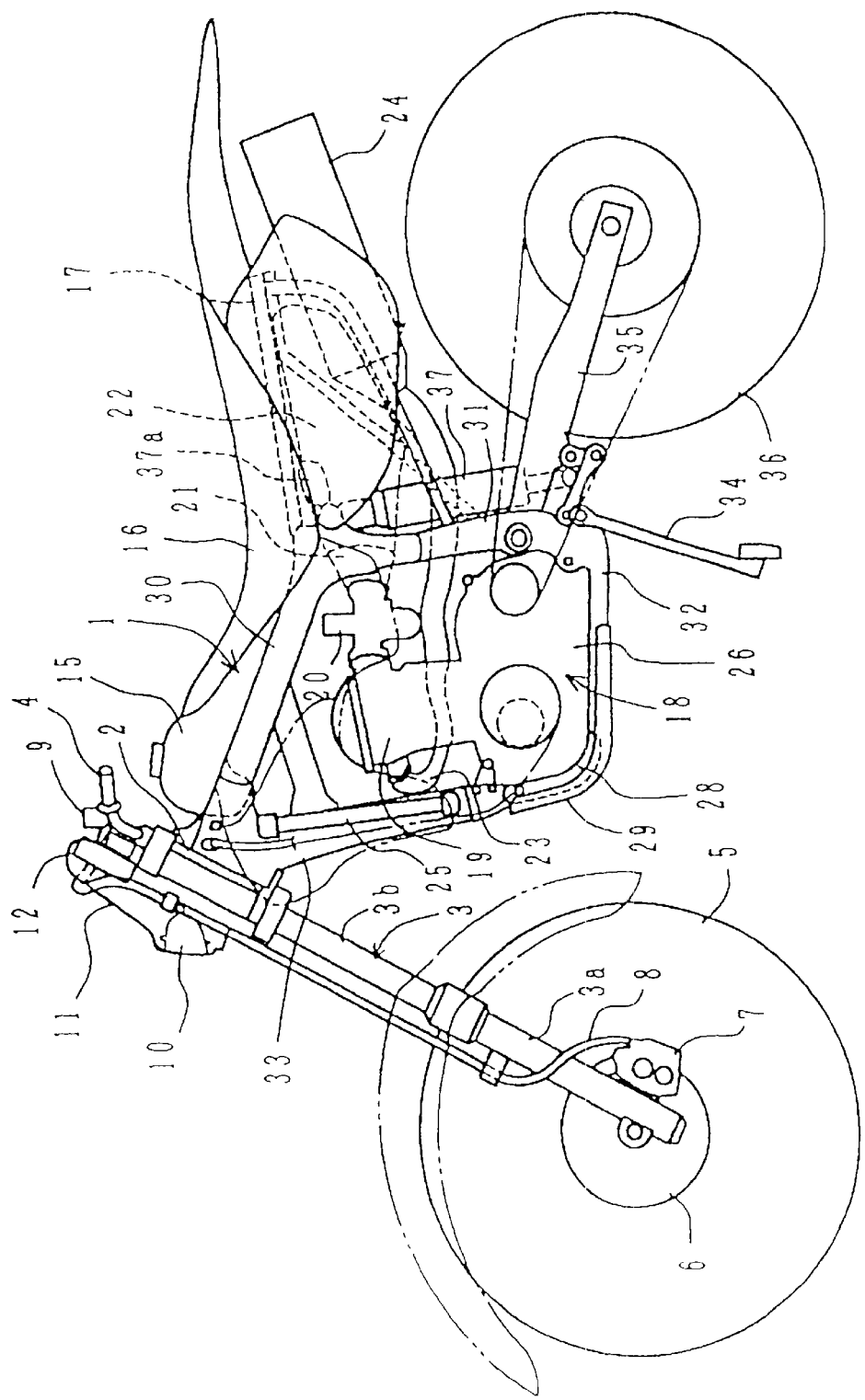
FIG. 1 is a side of a vehicle having an intake/exhaust structure according to an embodiment of the present invention.

FIG. 1 is a side view of a two-wheeled vehicle, which may be a motorcycle, according to an embodiment of the invention. The motorcycle has a front fork 3 rotatably supported on a head pipe 2, at a front end of a vehicle frame 1, and is steered using a handlebar 4. A front wheel 5 is supported at a lower end of the front fork 3, and a front wheel brake, comprising a concentrically attached brake disk 6 and a brake caliper 7, is also attached to the lower end of the front fork 3.

One end of a brake hose 8 is connected to the brake caliper 7, and the other end of the brake hose is connected to a master cylinder 9 provided proximate to a brake lever (not shown) of the handlebar 4. A middle section of the brake hose 8 extends substantially along the front fork 3. Reference numeral 3a indicates an outer tube of the front fork 3, reference numeral 3b indicates an inner tube, reference numeral 10 indicates a headlight, reference numeral 11 indicates a light case (small front cover) which may serve as a racing number plate, and reference numeral 12 indicates a meter.

A fuel tank 15 is supported on an upper surface of the vehicle frame 1, and a seat 16 is arranged to the rear of the fuel tank 15. A seat 16 is supported on a seat rail 17, and extends rearwardly and outwardly from a rear shoulder section of the vehicle frame 1. The vehicle frame 1 has a looped shape (when viewed from the side), and supports a water cooled engine 18. A carburetor 20 is connected to an intake port of the water cooled engine 18, behind a cylinder 19. The carburetor 20 is connected to an air cleaner 22 below the seat via a connecting tube 21.

An exhaust system has a front end of an exhaust pipe 23 connected to an exhaust port of the cylinder 19. The exhaust pipe 23 extends to the front and then curves at a steep angle and extends rearwardly, vertically separated from intake system parts, including the connecting tube 21, and is connected to a muffler 24 at a rear part of the vehicle.

The cooling system is arranged in front of the cylinder 19. Cooling water is supplied from a radiator 25 supported on the vehicle frame 1 to a water pump (not shown in this drawing) provided in a crankcase 26 of the water cooled engine 18. From the engine 18, water is sent to the cylinder 19 to cool the cylinder 19. A reserve tank 28 is housed between the skid plate 29 and the crankcase 26.

A front side of the vehicle frame 1 has a looped shape and is comprised of a main pipe 30, a pivot frame 31, a lower frame 32, and a front down pipe 33. A front end of a swingarm 35 is swingably supported by the pivot frame 31. A rear wheel 36 is supported at the rear end of the swingarm 35, a middle section of the swingarm 35 is attached to a lower end of a rear cushion unit 37 via a link, and the other end of the swingarm 35 extends upwardly and is connected to the pivot frame 31.

Reference numeral 37a indicates a reservoir tank located at an upper end of the rear cushion unit 37, and on an opposite side of the vehicle from the connecting tube 21 and the exhaust pipe 23. The presence of the reservoir tank 37a prevents passage of the exhaust pipe 23 etc.

A side stand 34 is rotatably attached to a lower end of the pivot frame 31. A lubrication system has an oil tank housed inside part of the vehicle frame, and oil is supplied to an oil pump of the crankcase 26.

Figure 2:
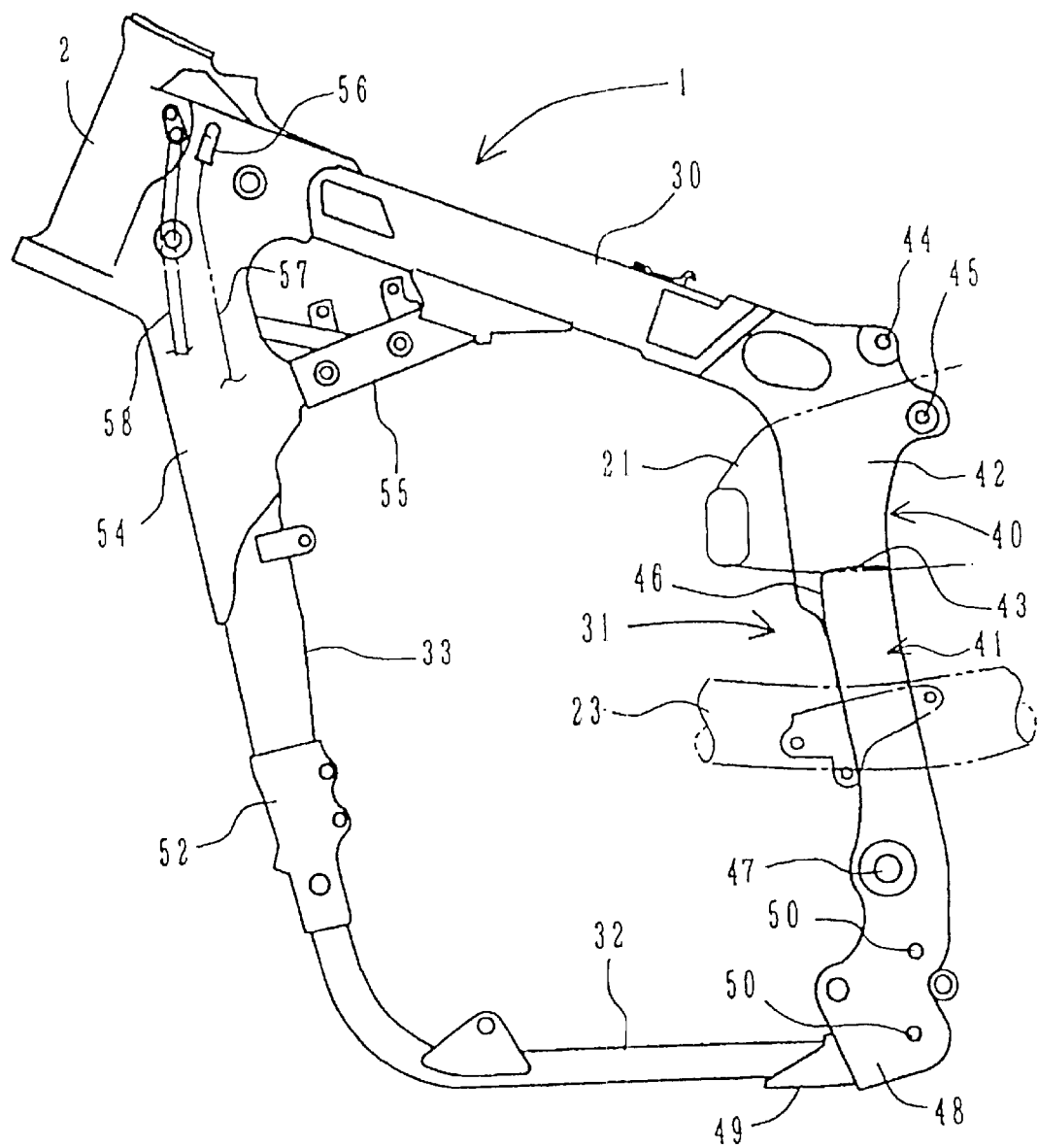
FIG. 2 is a side elevation of a vehicle frame of the vehicle.
Figure 3:
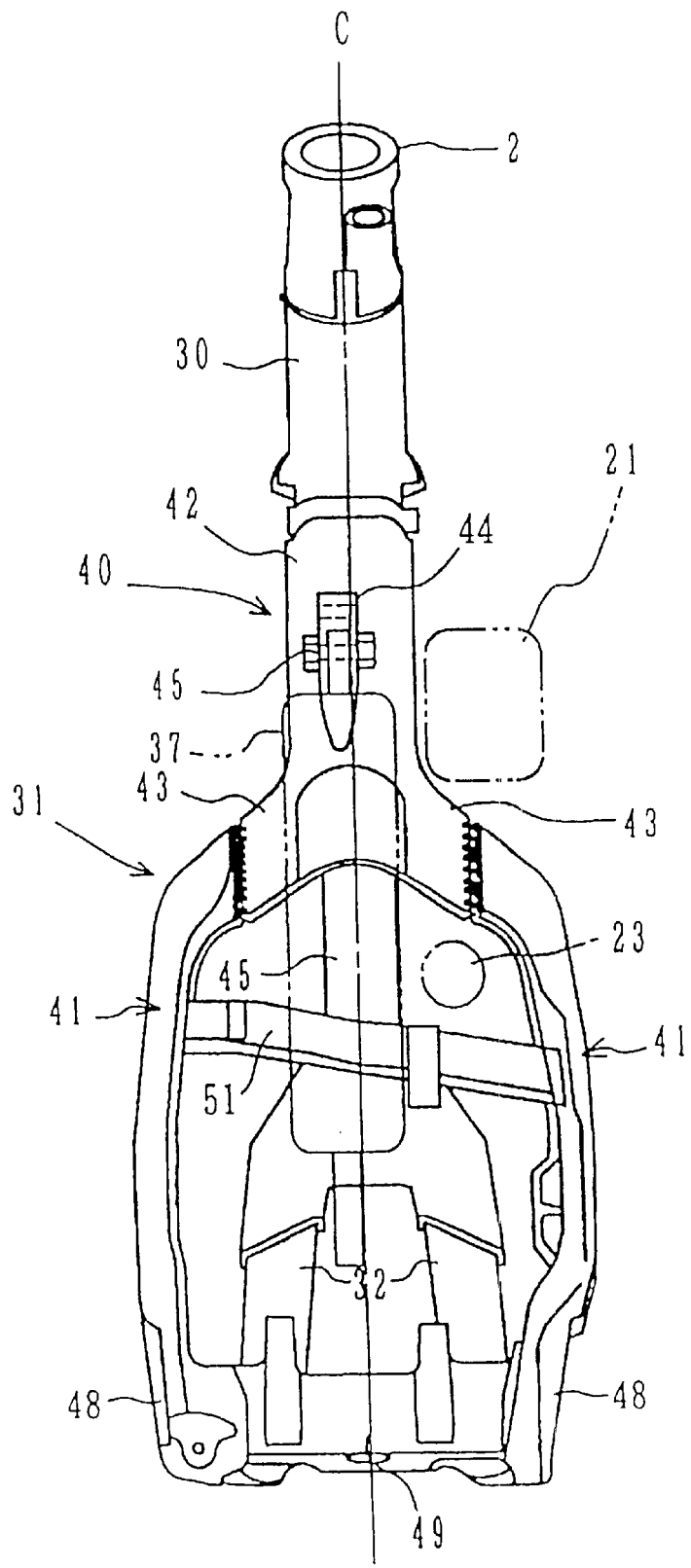
FIG. 3 is a rear view of the vehicle.

Next, the construction of the vehicle frame 1 will be described in more detail. FIG. 2 is a side view of the vehicle frame 1, and FIG. 3 is a rear view of the vehicle frame 1. The vehicle frame 1 has a main pipe 30 extending along the center of the vehicle. The pivot frame 31 is divided into an upper cross section 40 and into right and left pivot plates 41. The upper cross section 40 is bifurcated at arm sections 43, which extend outwardly from the upper cross section 40, an end of each arm section 43 being connected to one of the pivot plates 41.

The upper cross section 40 is a cast component, and is provided with a neck section 42 running along the center of the vehicle, extending vertically and connected to a rear end of the main pipe 30 at an upper end, and the arm section 43 branching out to the left and right at a lower end of the neck section 42.

A boss 44 for attachment of the seat rail 17 and an boss 45 for attachment of an upper end of the rear cushion unit 37 provided below the boss 44 are integrally formed in a rear part of the neck section 42.

The pivot plate sections 41 are cast components having a number of ribs formed on inner surfaces, an upper end 46 of the pivot plate section 41 is engaged with the arm sections 43 from the side in an overlapping manner, and contacting surfaces are welded together. Pivot sections 47 are provided in middle sections of the pivot plate sections 41, and the swing arm 35 is supported at these points. Lower end 48s of the pivot plates 41 are engaged with the lower cross section 49 from the side and welded.

Also, attachment holes 50 for a stand bracket are formed in side surfaces of the lower ends 48. As shown in FIG. 3, lower ends of a pair of left and right lower frames 32 are connected. Further, a cross frame 51 diagonally connecting between each of the middle sections of the left and right pivot plates 41 is provided above the lower cross section 49.

As shown in FIG. 3, the rear cushion unit 37 is arranged in a vertical direction with an upper end supported by the attachment boss 45, and the center of the rear cushion unit 37 deviates to the left relative to a vertical center line C of the vehicle.

Figure 4:
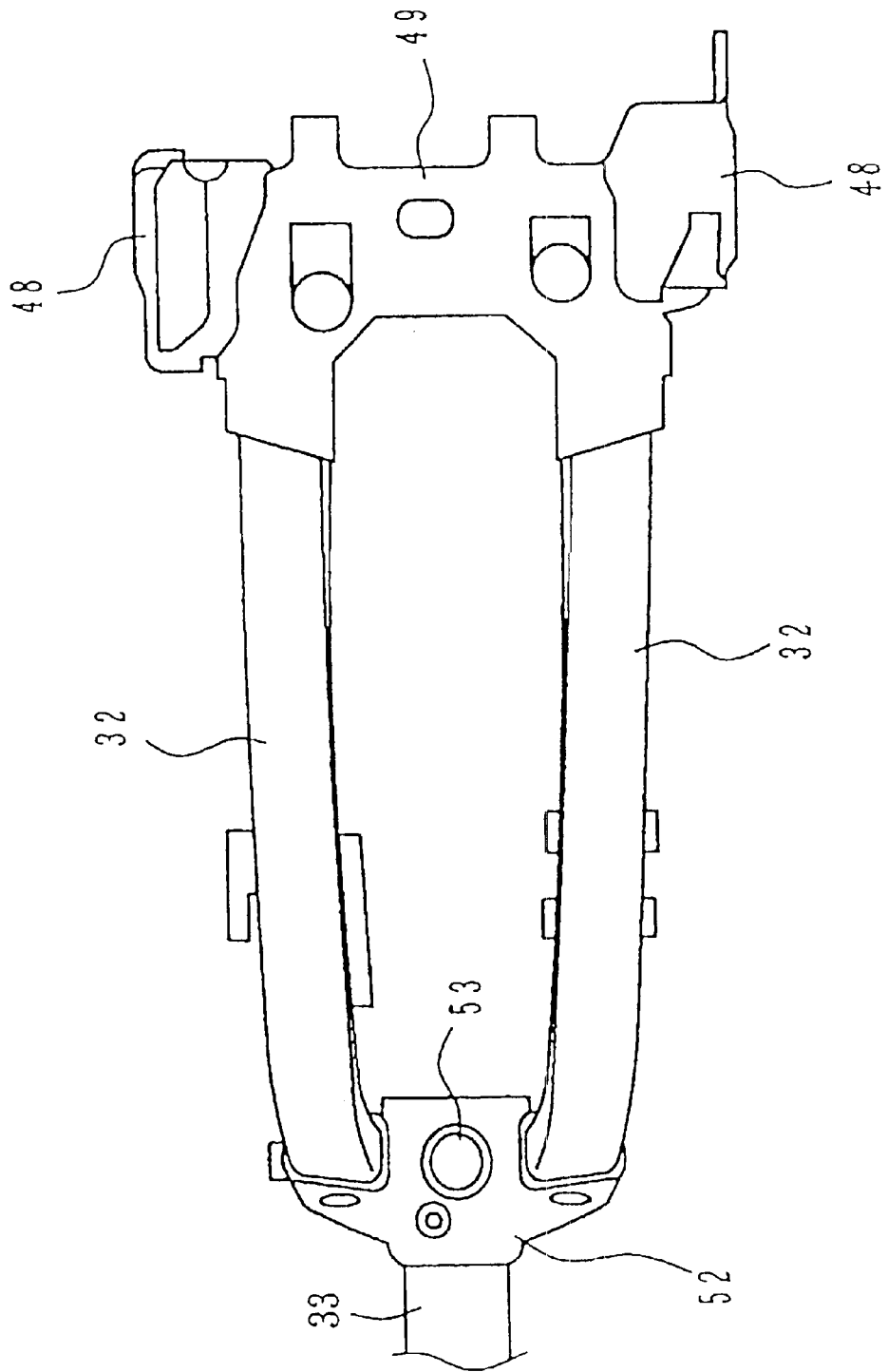
FIG. 4 is a bottom view of the vehicle.

FIG. 4 is a view of the lower frames 32 from below. The lower frames 32 have lower ends connected at the lower cross section 49, and front upper sides which become narrower, and connect to a joint member 52 provided on a lower end of the front down pipe 33. The joint member 52 has a bifurcated shape at the bottom, and a drain hole 53 is formed in the forked section.

The joint member 52 closes a lower end of the front down pipe 33, serving as a built-in oil tank. As shown in FIG. 2, the front down pipe 33 is constructed of a tank section 54 integrally cast with the head pipe 2 using aluminum alloy having high thermal conductivity. A reinforcement pipe 55 for connecting to the main pipe 30 is connected to a rear part of the tank section 54.

A breather pipe 56 is provided on a connecting section of an upper part of the head pipe 2 and a front end of the main pipe 30, and connects to an upper part of the cylinder 19 using a breather tube 57. An oil return port is provided close to the breather pipe, and an oil return pipe 58 is piped from an oil pump at the lower part of the crankcase 26 to the oil return port.

Next, the arrangement structure of the exhaust passageway and the intake passageway will be described. As shown in FIG. 3, the connecting tube 21 constituting the intake passageway and the exhaust pipe 23 constituting the exhaust passageway are arranged vertically on the same side of the vehicle (in this example on the right side). The connecting tube 21 is arranged above the arm sections 43, and the exhaust pipe 23 communicates with a space formed between the cross plate 51 below the arm sections.

Accordingly, as shown in FIG. 2, even if the connecting tube 21 and the exhaust pipe 23 are arranged substantially vertically parallel, by interposing the arm sections between them the arm section functions as a kind of radiating plate for the exhaust pipe 23, and heating of the connecting tube 21 is reduced. As a result of this, even if the connecting tube 21 of the intake passageway and the exhaust pipe 23 of the exhaust passageway are arranged on the same side of the vehicle, it is possible to prevent heat from the exhaust pipe 23 from heating the connecting tube. Arranging the connecting tube 21 and the exhaust pipe 23 on the same side of the vehicle reduces the interior volume occupied by the connecting tube 21 and the exhaust pipe 23.

As shown in FIG. 3, by placing the cross plate 51 on a slope, it becomes easier to run the exhaust pipe between the pivot plates 41. The vertical relationship between the connecting tube 21 and the exhaust pipe 23 is not fixed, as long as one is arranged above and one below the arm sections 43. Also, the upper cross section 40 is not always necessary, and it is possible to directly weld the arm sections close to rear ends of the main pipe 30, or to laterally connect using a cross member such as a simple pipe or plate member.

The invention being thus described, it will be obvious that the same may be varied in many ways. Such variations are not to be regarded as a departure from the spirit and scope of the invention, and all such modifications as would be obvious to one skilled in the art are intended to be included to be within the scope of the following claims.

What is claimed:

1. A vehicle comprising:

a frame, the frame comprising a head pipe for supporting a front wheel suspension, and a main pipe extending rearwardly from the head pipe and above a vehicle engine;

a swing arm operatively connected to the frame for supporting at least one rear wheel;

a front wheel suspension operatively connected to the head pipe;

a pivot frame, the pivot frame being operatively connected to a rear end of the main pipe, the pivot frame comprising a pair of left and right pivot plates for swingably supporting the swing arm, each pivot plate having an upper end;

a cross member extending between the left and right pivot plates;

an intake passageway for conveying air to the vehicle engine; and an exhaust passageway for conveying exhaust gases away from the engine, the intake passageway and the exhaust passageway being disposed on the same side of the vehicle; wherein a portion of the exhaust passageway is disposed above the cross member and below an upper end of the pivot plates.

2. The vehicle of claim 1, wherein the cross member has a longitudinal axis, the longitudinal axis of the cross member being obliquely disposed to a transverse axis of the vehicle.

3. The vehicle of claim 1, wherein at least a portion of the intake passageway is disposed above the upper end of one of the pivot plates.

4. The vehicle of claim 3, wherein at least a portion of the exhaust passageway is disposed below the upper end of one of the pivot plates.

5. The vehicle of claim 1, wherein the pivot frame further comprises:

an upper portion, the frame being connected to the main pipe at the upper portion of the pivot frame;

a first arm section extending from the upper portion outwardly from the pivot frame, the first arm section having an end connected to the left pivot plate; and a second arm section extending from the upper portion outwardly from the pivot frame, the second arm section having an end connected to the right pivot plate.

6. The vehicle of claim 5, wherein a connecting tube is at least partially disposed above one of the first arm section and the second arm section.

7. The vehicle of claim 6, wherein the exhaust passageway is located on the same side of the frame as the intake passageway, and is located below one of the first arm section or the second arm section.

8. The vehicle of claim 1, wherein the frame has a right and a left side, the sides being disposed on opposite sides of a longitudinal axis of the vehicle, both the intake passageway and the exhaust passageway being located on the same side of the frame.

9. The vehicle of claim 1, wherein the frame extends rearwardly and is bifurcated into a first and a second member, the first and second members each having a swing arm connection point for pivotably supporting the swing arm.

10. The vehicle of claim 9, wherein the first member is disposed between the intake passageway and the exhaust passageway.

11. The vehicle of claim 9, wherein at least a portion of the intake passageway is disposed above the first member, and at least a portion of the exhaust passageway is disposed below the first member.

12. The vehicle of claim 11, wherein the frame further comprises:

a bifurcated lower frame portion operatively connected to a lower portion of both the first and second members; and a front down pipe extending between the head pipe and the bifurcated lower frame portion.

13. The vehicle of claim 1, wherein the at least one rear wheel consists of one wheel.

14. The vehicle of claim 1, wherein the vehicle is a motorcycle.

* * * * *